UNITED STATES PATENT OFFICE.

JOHN M. MERRYMON, OF INDIANAPOLIS, INDIANA.

IMPROVED PIGMENT AND VEHICLE FOR MIXING PAINTS.

Specification forming part of Letters Patent No. 45,426, dated December 13, 1864.

*To all whom it may concern:*

Be it known that I, JOHN M. MERRYMON, of Indianapolis, in the county of Marion and State of Indiana, have invented a new and useful Paint Pigment and Vehicle for Mixing Paints; and I do hereby declare that the following is a full and exact description for preparing and using the same.

Into a suitable vessel I put any required quantity of pulverized kaolin, or any similar white clay—such as what is commonly known as "porcelain" or "fire-clay"—and then pour over it a sufficient quantity of bichromate of potash, previously dissolved in water, to fully saturate and cover said clay, and let it remain for six hours, frequently stirring it during the time. I then pour in just a sufficient quantity of diluted sulphuric acid to fully neutralize and precipitate any excess of alkali or other substance that may still remain from the action of the solution of the bichromate of potash on the clay at the end of the said six hours. The quantity of sulphuric acid necessary may be determined by testing the solution with litmus-paper. After the solution has settled from the stirring necessary to give it when the acid is added, I then draw it off with a siphon, and frequently wash the pigment left in the vessel, in order to cleanse it of all coloring-matter, and then dry and pulverize it for use. The solution thus drawn off I put by in a proper vessel to be reserved for use.

The paint pigment prepared as above described may now be used to grind in oil, with other paints and colors, to almost any extent desired, as it is very susceptible of receiving color and uniting with other paints in oil without destroying their body or durable qualities. Its susceptibility of receiving and holding coloring-matter under certain circumstances also makes it a very important base in manufacturing paints and colors from the raw materials—such as chrome yellow and green and Prussian blue, &c. To do this I dissolve or soften the pigment in water, and add to it in the ordinary way the chemical materials necessary to produce the paint or color desired, and proceed with it as with any other base for the same purpose.

I have found that the colors made with this pigment are brighter in oil, and better in regard to strength of color and body than those made in the ordinary way, and the cost of material is lessened more than one-half.

I use my solution of bichromate of potash, as above described, as a vehicle for grinding and mixing paints and colors in oil; and in order to grind dry paints in oil I soften down the color first with oil, and then when put in the mill to grind, gradually temper it down with the solution of bichromate of potash to a proper consistency, when ground, to be put up in cans, thus making a saving of at least one-third of the oil necessary to grind the paint; and in order to use the solution as a vehicle for mixing paints, I first thin the paint down with oil almost to the consistency necessary for use with the brush, and then add the solution of bichromate of potash and stir it into the mixture as free and easy as oil would do, and it answers a better purpose than oil, as it does not lessen the body nor materially change the features of the mixture. This solution may be used in mixing paints to almost any extent desired, owing to the purpose for which it may be applied. I wish to state, also, that said solution precludes the necessity of using driers in mixing paints, as it fully answers all the purpose, and at the same time makes the paint spread under the brush more free and easy. I will state that said solution will not do to use with white paints—such as white zinc, lead, &c.—as it has the property of chemically uniting with them and changing the color to yellow; but all colors commonly used in painting it does not affect, but tends to heighten and brighten the color, without changing it.

What I claim as my invention, and desire to secure by Letters Patent, is—

The white-clay paint pigment and the solution of bichromate of potash in water, prepared and used in the manner and for the purpose as above described.

JOHN M. MERRYMON.

In presence of—
W. H. DE MOTTE,
H. P. LANTZ.